(12) United States Patent
King et al.

(10) Patent No.: US 7,870,985 B2
(45) Date of Patent: Jan. 18, 2011

(54) CARRYING APPARATUS FOR CYCLE-TYPE VEHICLE

(76) Inventors: Steven Mark King, 12103 Coldstream Creek, Coldstream, BC (CA) V1B 1E8; Glen Andrew Taylor, 7709 Giles Drive, Coldstream, BC (CA) V1B 1G4

( * ) Notice: Subject to any disclaimer, the term of this patent is extended or adjusted under 35 U.S.C. 154(b) by 843 days.

(21) Appl. No.: 11/829,825

(22) Filed: Jul. 27, 2007

(65) Prior Publication Data

US 2008/0023511 A1 Jan. 31, 2008

Related U.S. Application Data

(60) Provisional application No. 60/820,664, filed on Jul. 28, 2006.

(51) Int. Cl.
*B62J 7/00* (2006.01)
*B62J 11/00* (2006.01)
*B62J 9/00* (2006.01)

(52) U.S. Cl. ............... 224/413; 224/430; 224/433; 224/427; 224/459; 224/454; 224/441; 224/419

(58) Field of Classification Search .......... 224/413, 224/430, 433, 427, 459, 454, 441, 419; D12/407
See application file for complete search history.

(56) References Cited

U.S. PATENT DOCUMENTS

| | | | |
|---|---|---|---|
| 2,837,346 A | 6/1958 | Chambless | |
| 3,530,919 A | 9/1970 | May | |
| 3,938,719 A * | 2/1976 | Carlton | 224/419 |
| 4,770,326 A * | 9/1988 | Thompson | 224/418 |
| D310,807 S | 9/1990 | Lynch | |
| 5,207,361 A * | 5/1993 | Slifka | 224/419 |
| 5,575,413 A | 11/1996 | Starry | |
| D409,557 S | 5/1999 | Armour | |
| 6,149,041 A * | 11/2000 | Perino et al. | 224/645 |
| 6,227,426 B1 * | 5/2001 | Martin et al. | 224/421 |
| 6,293,450 B1 * | 9/2001 | Aron | 224/430 |
| 6,401,998 B1 * | 6/2002 | Puluso | 224/422 |
| 6,499,638 B2 * | 12/2002 | Campbell | 224/430 |
| 6,619,522 B2 * | 9/2003 | Schurr | 224/413 |
| 6,698,635 B1 * | 3/2004 | Brown | 224/413 |
| 6,938,806 B2 * | 9/2005 | James | 224/413 |
| 7,150,382 B2 * | 12/2006 | Zickefoose | 224/423 |
| 7,156,272 B2 * | 1/2007 | Dean | 224/413 |
| 7,207,470 B2 * | 4/2007 | Akita et al. | 224/413 |
| 2003/0209581 A1 | 11/2003 | Adams | |

(Continued)

FOREIGN PATENT DOCUMENTS

AU 1520783 8/1983

(Continued)

*Primary Examiner*—Nathan J Newhouse
*Assistant Examiner*—Lester L Vanterpool
(74) *Attorney, Agent, or Firm*—Oyen Wiggs Green & Mutala LLP

(57) ABSTRACT

A carrying apparatus for a cycle-type vehicle comprises a pair of object carriers releasably mountable on corresponding transverse sides of the cycle, a pair of upper support members which extend transversely between the cycle and the object carriers to support upper portions of the object carriers, and, a pair of lower support members which extend transversely between the cycle and the object carriers to support lower portions of the object carriers.

21 Claims, 12 Drawing Sheets

U.S. PATENT DOCUMENTS

| | | |
|---|---|---|
| 2005/0040196 A1 | 2/2005 | Dean |
| 2005/0121482 A1* | 6/2005 | Zickefoose .................. 224/413 |
| 2005/0150921 A1* | 7/2005 | Schneider ................... 224/413 |
| 2005/0258207 A1 | 11/2005 | Sadler |
| 2007/0138223 A1 | 6/2007 | Brown |

FOREIGN PATENT DOCUMENTS

| | | |
|---|---|---|
| CA | 2079637 | 11/1993 |
| GB | 21964 | 7/1913 |
| JP | 8301168 | 11/1996 |
| WO | WO91/18650 | 12/1991 |

* cited by examiner

CARRYING APPARATUS FOR CYCLE-TYPE VEHICLE

REFERENCE TO RELATED APPLICATION

This application claims the benefit of the filing date of U.S. patent application No. 60/820,664 filed 28 Jul. 2007 and entitled "CARRYING APPARATUS FOR CYCLE-TYPE VEHICLE", which is hereby incorporated by reference herein.

TECHNICAL FIELD

This invention relates to carrying objects on cycle-type vehicles. Particular embodiments of the invention provide carrying apparatus for carrying golf clubs on cycle-type vehicles.

BACKGROUND

One issue for riders of cycle-type vehicles (e.g. two and three-wheeled motorcycles, two and three-wheeled pedal cycles and the like) is carrying objects. Examples of difficulties associated with carrying objects on a cycle-type vehicle include: instability of the cycle when an object is carried on one transverse side of the cycle; reduced aerodynamics when objects are carried on the cycle; reduced ability (or impossibility) to carry a passenger when objects are carried on the cycle; and reduced ability to travel for long periods (or at high speeds) when objects are carried on the cycle.

There are a variety of prior art apparatus for carrying objects on cycle-type vehicles, including, for example:
- U.S. patent application publication No. 2007/0138223 (Brown)
- U.S. patent application publication No. 2003/0209581 (Adams);
- U.S. Pat. No. 5,575,413 (Starry);
- U.S. Pat. No. 4,770,326 (Thompson);
- Japanese patent No. 8301168 (Kenji);
- U.S. design Pat. No. D310,807 (Lynch);
- U.S. Pat. No. 6,401,998 (Puluso);
- U.S. patent application publication No. 2005/0040196 (Dean);
- U.S. Pat. No. 5,207,361 (Slifka);
- U.S. Pat. No. 6,619,522 (Schurr); and
- U.S. Pat. No. 6,938,806 (James).

Due to various disadvantages, none of the these apparatus have achieved widespread commercial success.

There is a general desire for improved apparatus for carrying objects on cycle-type vehicles.

SUMMARY

One aspect of the invention provides a carrying apparatus for a cycle-type vehicle. The carrying apparatus comprises: a pair of object carriers releasably mountable on corresponding transverse sides of the cycle; a pair of upper support members which extend transversely between the cycle and the object to support upper portions of the object carriers; and, a pair of lower support members which extend transversely between the cycle and the object carriers to support lower portions of the object carriers. In some embodiments, only one object carrier may be mounted on the cycle.

Another aspect of the invention provides a carrying apparatus for a cycle-type vehicle comprising: a pair of object carriers releasably mountable on corresponding transverse sides of the cycle; an upper mounting assembly coupleable to the cycle at a location behind a rear seat of the cycle; a pair of lower mounting assemblies coupleable to a pair of foot peg members on the corresponding transverse sides of the cycle; and, a plurality of support members releasably coupleable at first ends thereof to the upper mounting assembly and the lower mounting assemblies and releasably coupleable at second ends thereof to the object carriers.

Another aspect of the invention provides a method of mounting an object carrier on a cycle-type vehicle. The method comprises: coupling an upper mounting assembly to the cycle at a location behind a rearward seat of the cycle; coupling a lower mounting assembly to a foot peg member of the cycle; coupling a transversely extending upper support member between the upper mounting assembly and an upper portion of the object carrier; and, coupling a transversely extending lower support member between the lower mounting assembly and lower portion of the object carrier.

Preferably, the object-carrying apparatus allows a passenger to sit comfortably on the rearward seat of the cycle with their feet resting on the foot peg members. The object carriers are independently supported at their upper portions (by the upper support members) and at their lower portions (by the lower support members). The upper support members may be coupled to the cycle at locations above a rear wheel of the cycle. The lower support members may be coupled to passenger foot peg members of the cycle. Other than through the object carriers themselves, the upper support members are preferably not connected to the foot peg members or to the lower support members (i.e. there is no connection extending vertically between the upper support members and the foot peg members or the lower support members). The object carriers may be disposed rearwardly and/or downwardly of the rearward seat of the cycle. Furthermore, the lower support members and the upper support members may extend sufficiently far in the transversely outward direction to accommodate the legs of a passenger seated on the rearward seat of the cycle.

The support members may also extend sufficiently far in the transversely outward direction to accommodate saddlebags or the like mounted between the object carriers and the cycle. The saddlebags may be conventionally mounted, and may comprise fixed, removable, rigid, deformable, or any other type of saddlebags.

Further aspects of the invention, further features of specific embodiments of the invention and applications of the invention are described below.

BRIEF DESCRIPTION OF DRAWINGS

In drawings which show non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the disclosure. Accordingly, the specification and drawings are to be regarded in an illustrative, rather than a restrictive, sense.

Figure 1:
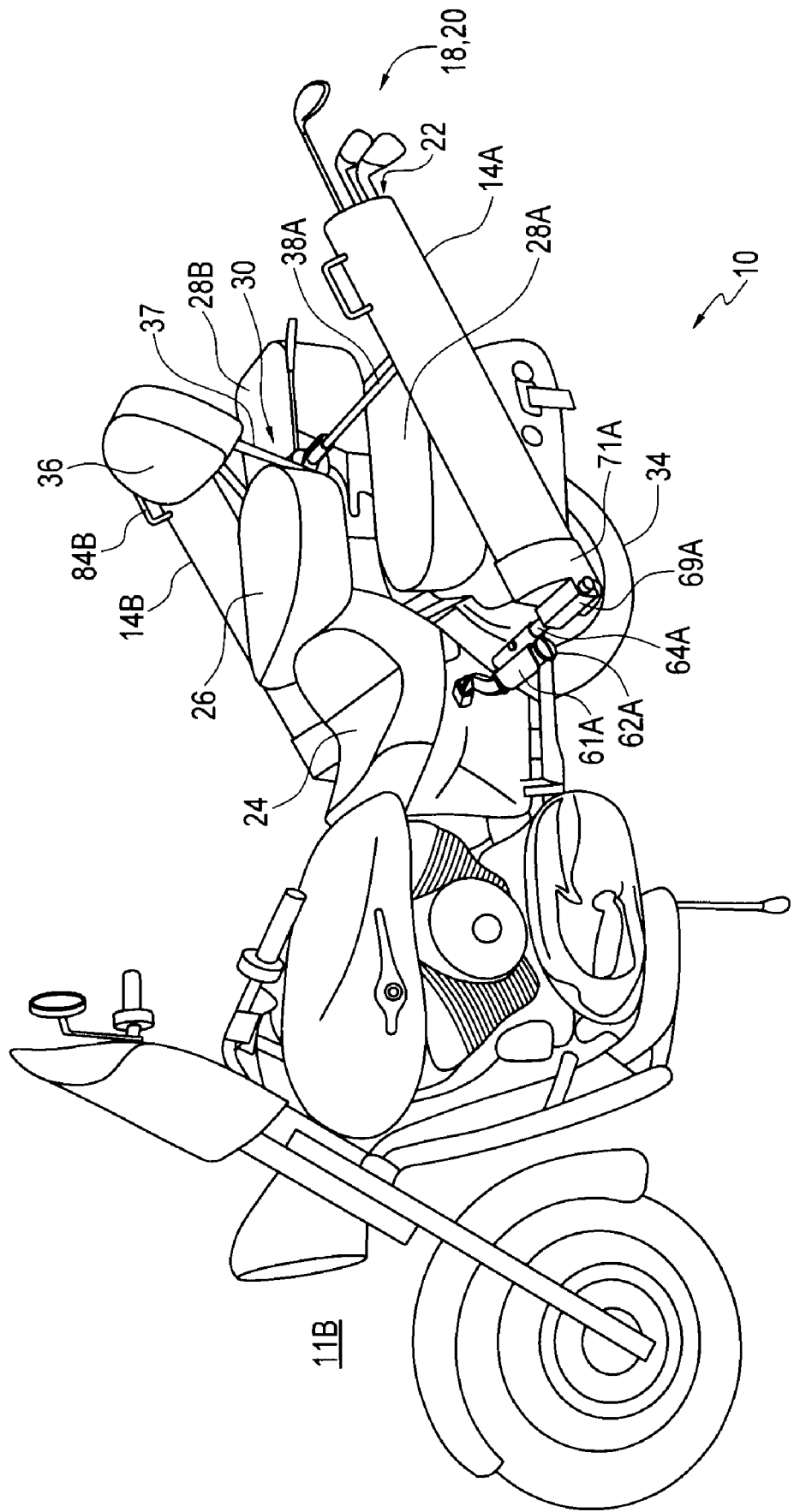
FIG. 1 shows a motorcycle equipped with a carrying apparatus according to one embodiment of the invention.
Figure 2:
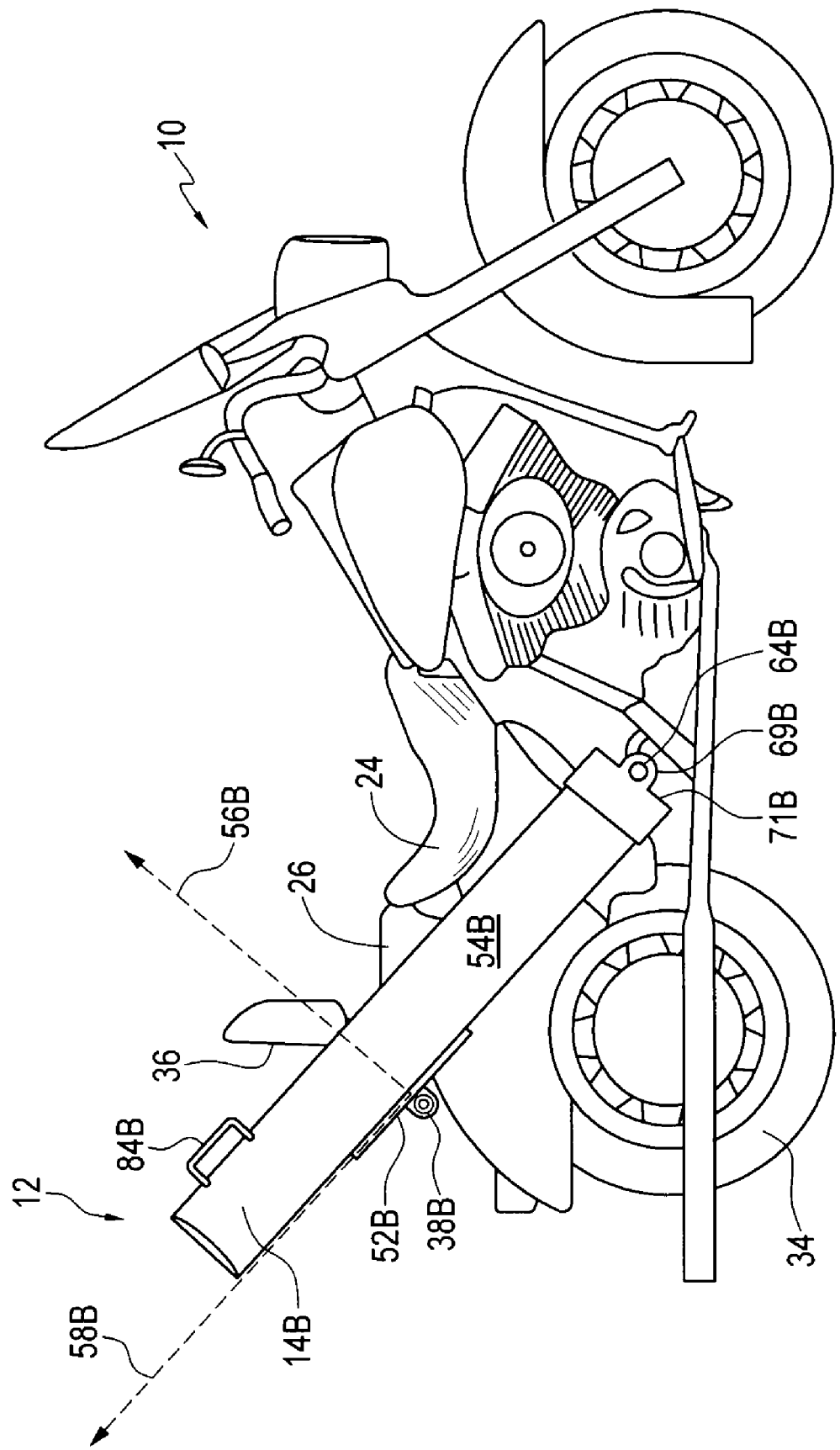
FIG. 2 is a schematic side view of a motorcycle equipped with the FIG. 1 carrying apparatus.
Figure 5A:
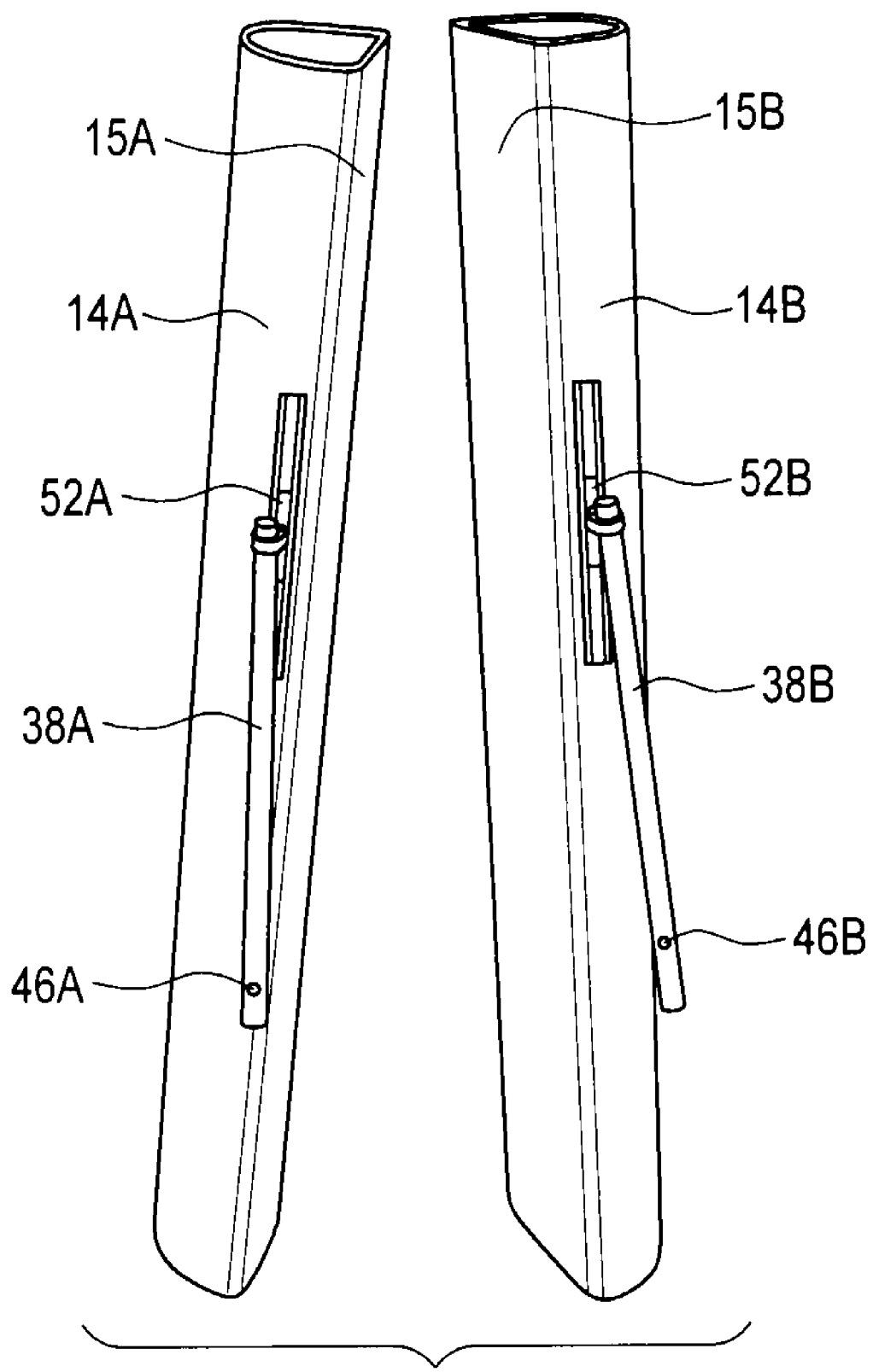
FIG. 5A shows two object carriers of a carrying apparatus according to one embodiment of the invention uncoupled from the cycle.
Figure 5B:
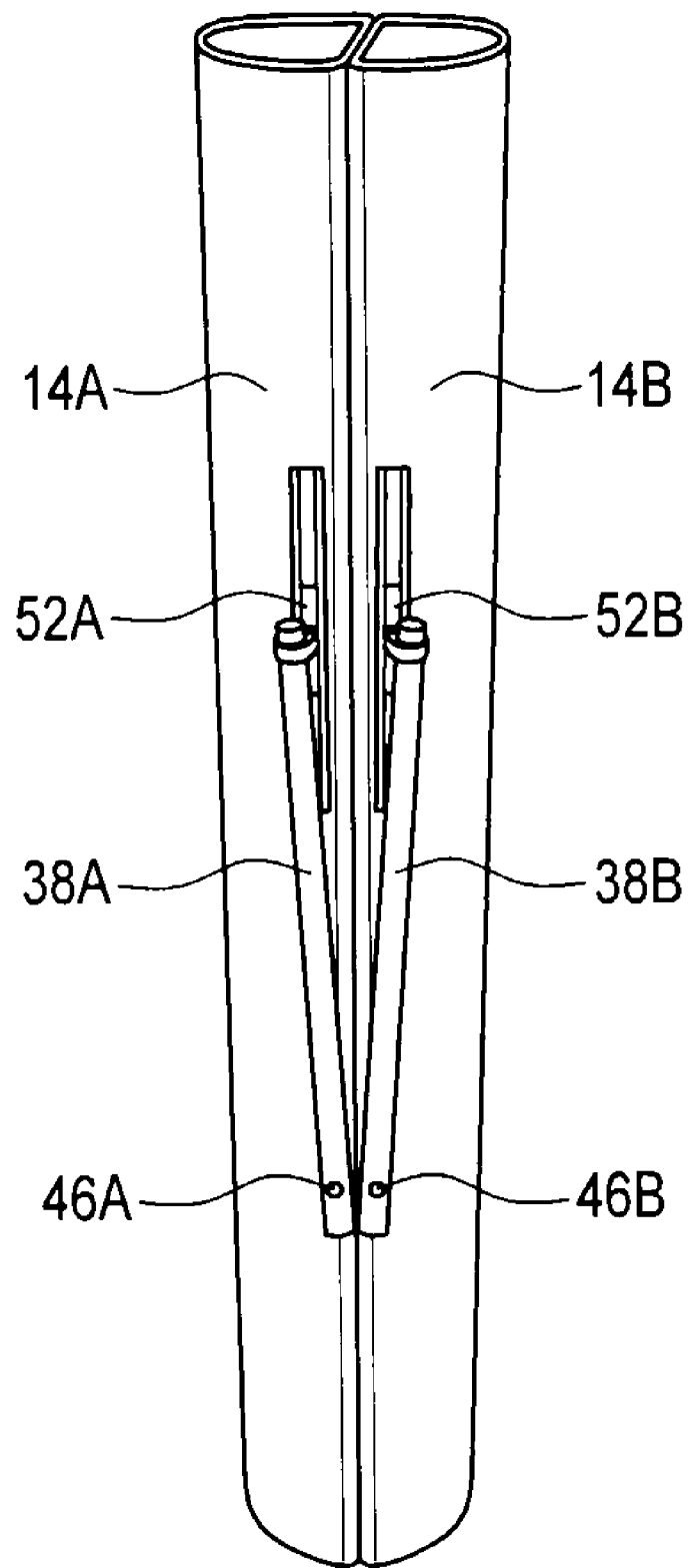
FIG. 5B shows the two object carriers of FIG. 5A coupled to one another to form a single object carrier.

FIG. 1 shows a motorcycle 10 equipped with a carrying apparatus 12 according to a particular embodiment of the invention. In the illustrated embodiment, carrying apparatus 12 is used to carry golf clubs, although it will be understood by those skilled in the art that carrying apparatus according to the invention could be used to carry other objects. Carrying apparatus 12 comprises a plurality of object carriers 14A, 14B. When carrying apparatus 12 is mounted on cycle 10, object carriers 14A, 14B are disposed on opposing transverse sides 11A, 11B of cycle 10. When removed from cycle 10, object carriers 14A, 14B may be coupled to one another to form a single object carrier 16, as shown in FIG. 5B and described in more particular detail below.

In this description, many features of the illustrated embodiments comprise corresponding features on opposing transverse sides 11A, 11B of cycle 10. Such features are described with similar reference numerals and are distinguished from one another using the letter "A" to describe features (e.g. object carrier 14A) on the left hand side 11A of cycle 10 and the letter "B" to describe features (e.g. object carrier 14B) on the right hand side 11B of cycle 10. In some instances, the description refers to features on the left and right hand sides 11A, 11B of cycle 10, but, for the sake of simplicity, the drawings only show the feature on one side of cycle 10. The reader should understand that the embodiments described herein may have similar features on both transverse sides 11A, 11B of cycle 10 (even where such features are not specifically shown in the illustrated views), although this is not required in all embodiments.

Each of object carriers 14A, 14B is operable to securely carry one or more objects 18 when cycle 10 is moving or standing still (FIG. 1). In the illustrated embodiment, object carriers 14A, 14B comprise openings (not specifically enumerated) at their upper ends for inserting objects 18 into object carriers 14A, 14B. Object carriers 14A, 14B may comprise covers (not shown) which extend over the open upper ends of object carriers 14A, 14B to form object-carrying enclosures for housing objects 18. Such covers may be releasably coupleable to object carriers 14A, 14B using snap fasteners, zipper closures, hook and loop fasteners or the like. In some embodiments, object carriers 14A, 14B comprise one or more of deformable snap-together fastener components. These fasteners may be releasably coupleable to like fasteners affixed to covers which extend over the open upper ends of object carriers 14A, 14B to form object-carrying enclosures for housing objects 18.

In some embodiments, object carriers 14A, 14B (and possibly their corresponding covers) are fabricated at least in part from leather, which insulates the interior of object carriers 14A, 14B from ambient temperature and moisture and provides resistance against wear. Those skilled in the art will appreciate that object carriers 14A, 14B may be fabricated at least in part from other materials (e.g. plastic-type materials, suitable natural or synthetic fiber materials and the like), and that such materials may be selected for their capacity to insulate the interior of object carriers 14A, 14B from ambient temperature and moisture and for their capacity to resist wear.

In the illustrated embodiment, objects 18 comprise golf clubs 20 and, optionally, other golfing equipment and/or paraphernalia (e.g. gloves, shoes, tees, balls, pencils, umbrellas etc.). Object carriers 14A, 14B may comprise features particular for holding golf clubs 20. Such features may include a plurality of removable separators 22 (see FIG. 4) for dividing object carriers 14A, 14B into a plurality of golf club holding regions, and/or one or more optional pouches or the like (not shown) for holding other golf paraphernalia. Such optional pouches or the like may be releasably coupleable to object carriers 14A, 14B. Those skilled in the art will appreciate that objects 18 are not limited to golf clubs 20 and other golfing paraphernalia. In other embodiments, object carriers 14A, 14B may comprise bags, sacks, boxes, enclosures or the like for carrying other types of objects 18, such as other forms of sporting equipment, tools, clothes, building materials, flyrod tubes, poster or architecture plan tubes, or the like.

Object carriers 14A, 14B are preferably mountable on opposing transverse sides 11A, 11B of cycle 10 to permit transportation of objects 18 thereon. The mountability of object carriers 14A, 14B to opposing transverse sides 11A, 11B of cycle 10 can improve the stability of cycle 10 by balancing weight on both transverse sides 11A, 11B thereof. However, in some embodiments one of object carriers 14A, 14B may be mounted to only one side cycle 10, if so desired by the user. As shown in FIGS. 1-4 and discussed in more detail below, carrying apparatus 12 may comprise a number of features which permit object carriers 14A, 14B to be mounted on opposing transverse sides 11A, 11B of cycle 10, while still enabling cycle 10 to be comfortably ridden with both a rider on forward seat 24 and a passenger on rearward seat 26. As also shown in FIGS. 1-4 and discussed in more detail below, carrying apparatus 12 may comprise a number of features which permit object carriers 14A, 14B to be mounted on opposing transverse sides 11A, 11B of cycle 10, while still enabling cycle 10 to carry saddlebags 28A, 28B on opposing transverse sides 11A, 11B thereof. Saddlebags 28A, 28B may be conventionally mounted, and may comprise fixed, removable, rigid, deformable, or any other type of saddlebags.

Carrying apparatus 12 comprises an upper mounting assembly 30 which is coupled to cycle 10. In some embodiments, upper mounting assembly 30 is mounted on cycle 10 at a location that is rearward of rearward seat 26 and above rear wheel 34. Coupling upper mounting assembly 30 to cycle 10 in such a location allows a passenger to sit comfortably in rearward seat 26. Upper mounting assembly 30 may alternatively be coupled to cycle 10 at another location. Preferably, however, an alternative coupling location for upper mounting assembly 30 may be selected such that upper mounting assembly 30 does not interfere with the comfort of a passenger seated on rearward seat 26.

In some embodiments, upper mounting assembly 30 comprises mounting members 31A, 31B. An example mounting member 31A according to one embodiment is shown in FIG. 8A. Each mounting member 31A, 31B may comprise a flange 32A, 32B having apertures 33A, 33B for facilitating the coupling of bracket 31A, 31B to cycle 10. In the embodiment of FIG. 1, mounting members 31A, 31B are coupled to the supports 37 for backrest 36 of cycle 10 by bolts or the like (not specifically enumerated) extending though apertures 33A, 33B and corresponding apertures (not specifically enumerated) in the supports 37 for backrest 36. In general, however, upper mounting assembly 30 may be coupled to any one or more part(s) of cycle 10. Preferably, as discussed above, upper mounting assembly 30 is coupled to cycle 10 at a location that is rearward of rearward seat 26 and above rear wheel 34, or at some other location where upper mounting assembly 30 does not interfere with the comfort of a passenger seated on rearward seat 26.

Figure 3:
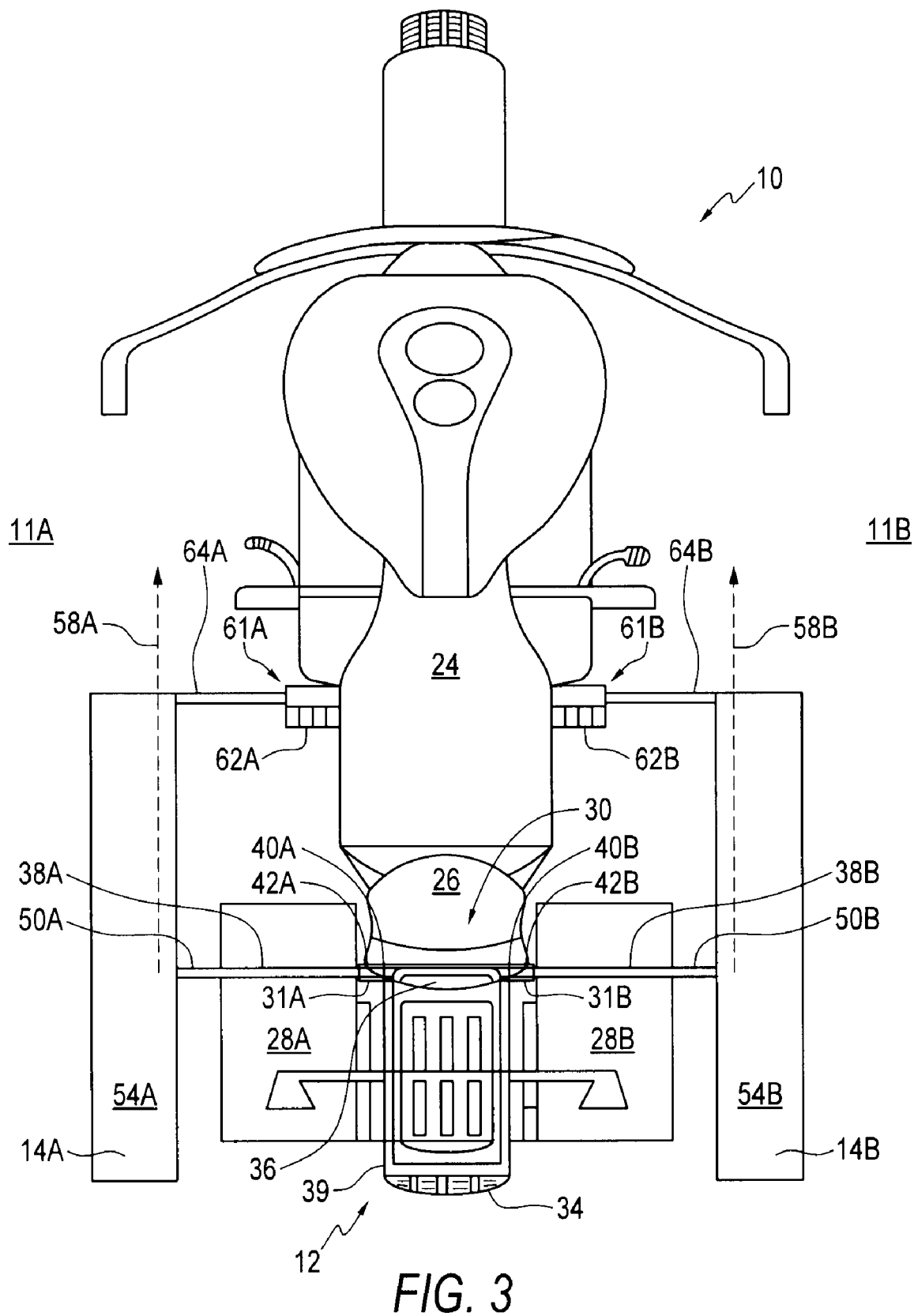
FIG. 3 is a schematic top view of a motorcycle equipped with a carrying apparatus according to another embodiment of the invention.
Figure 4:
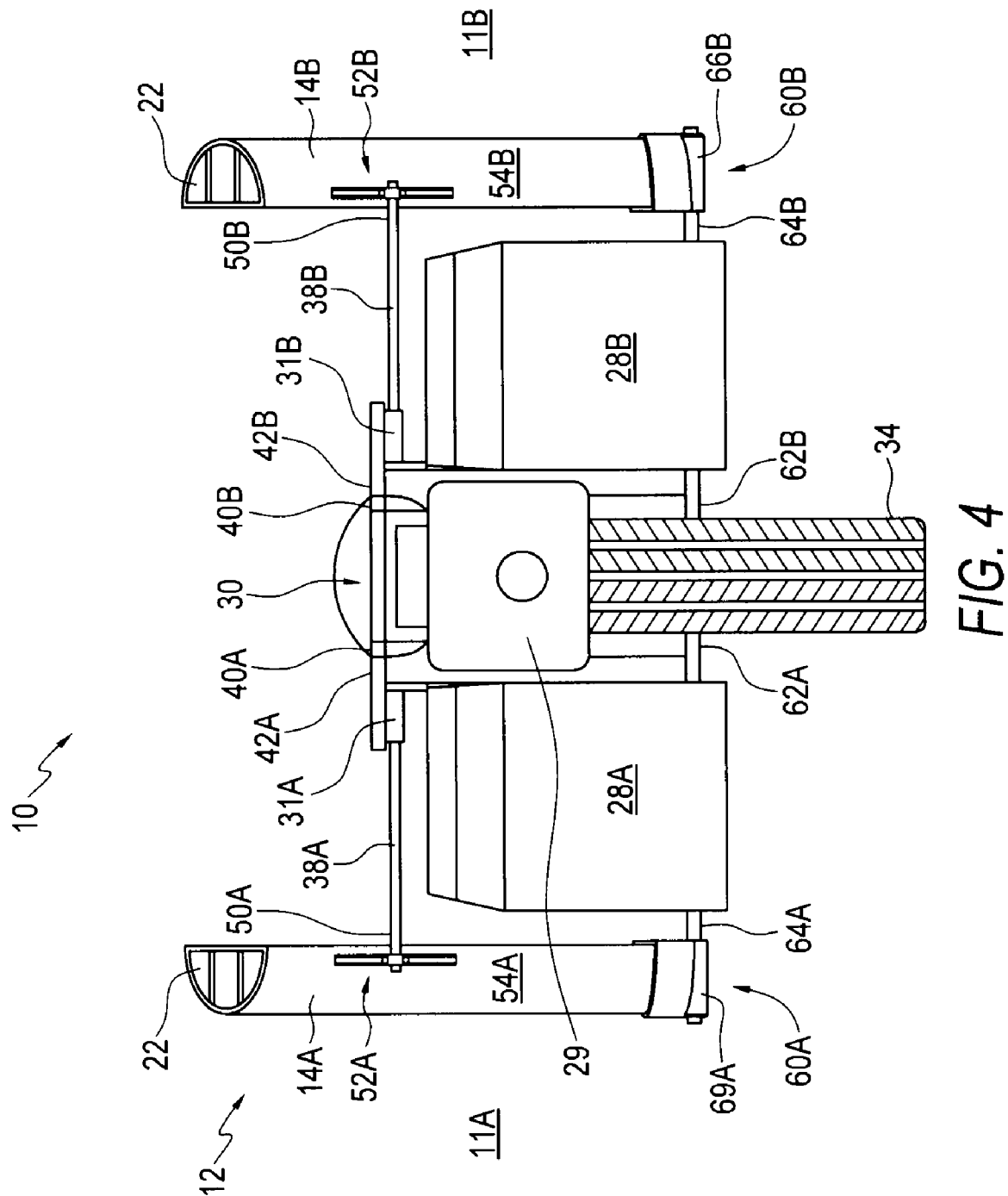
FIG. 4 is a schematic rear view of a motorcycle equipped with a carrying apparatus according to another embodiment of the invention.
Figure 6A:
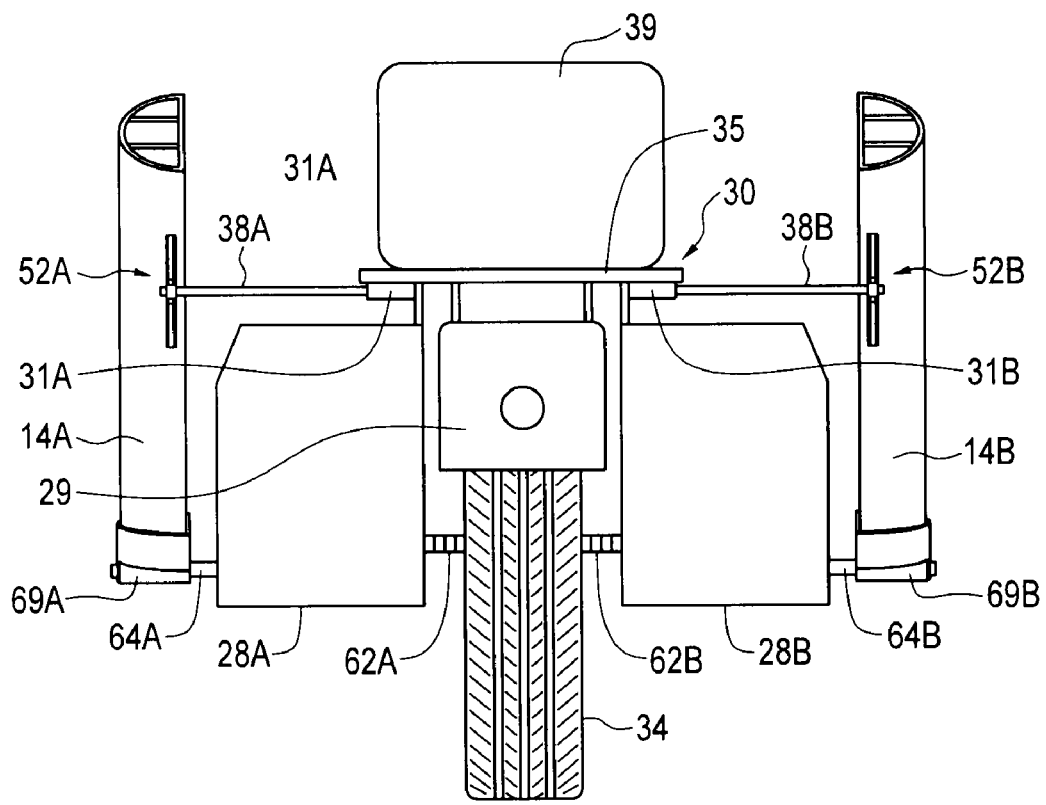
FIG. 6A is a schematic rear view of a motorcycle equipped with a carrying apparatus according to another embodiment of the invention.

In some embodiments, upper mounting assembly 30 may comprise a rail 35 for receiving mounting members 31A, 31B. Such embodiments may be desirable in situations where cycle 10 comprises luggage carrying apparatus 39 such as a rack or storage container, as shown for example in FIGS. 3 and 6A, or where cycle 10 does not have a backrest, as shown in FIG. 4. Rail 35 may be attached underneath luggage carrying apparatus 39 (as shown in FIGS. 3 and 6A) or atop a fender 29 (as shown in FIG. 4). In some embodiments, rail 35 may be coupled to cycle 10 using bolts (not shown) which are used to attach luggage carrying apparatus 39 to cycle 10. In other embodiments, other mechanisms could be used to couple rail 35 to cycle 10, as will be apparent to one skilled in the art.

Figure 6B:
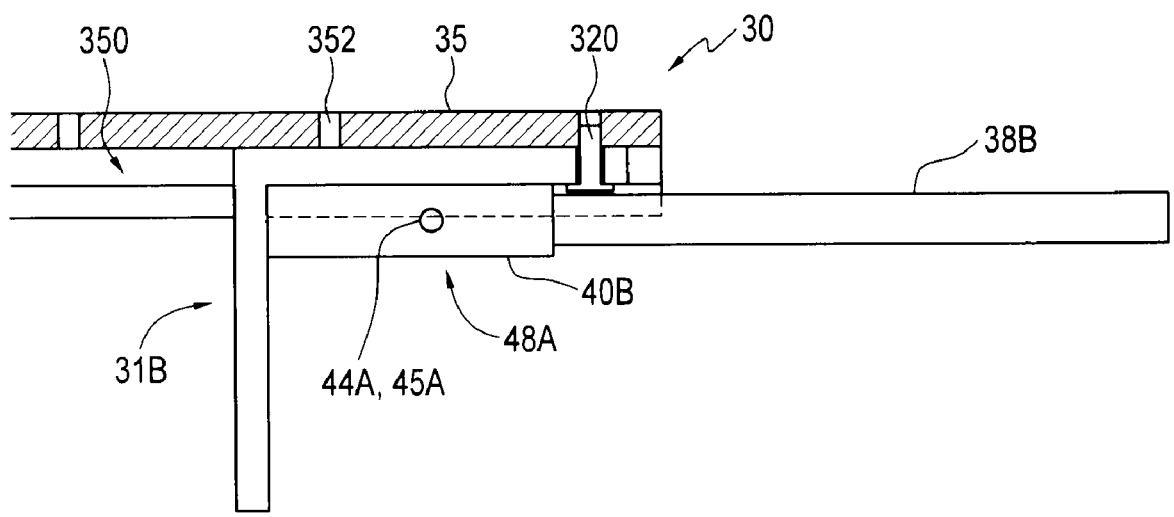
FIG. 6B is a magnified view of a portion of the upper mounting assembly of the FIG. 6A carrying apparatus.
Figure 8B:
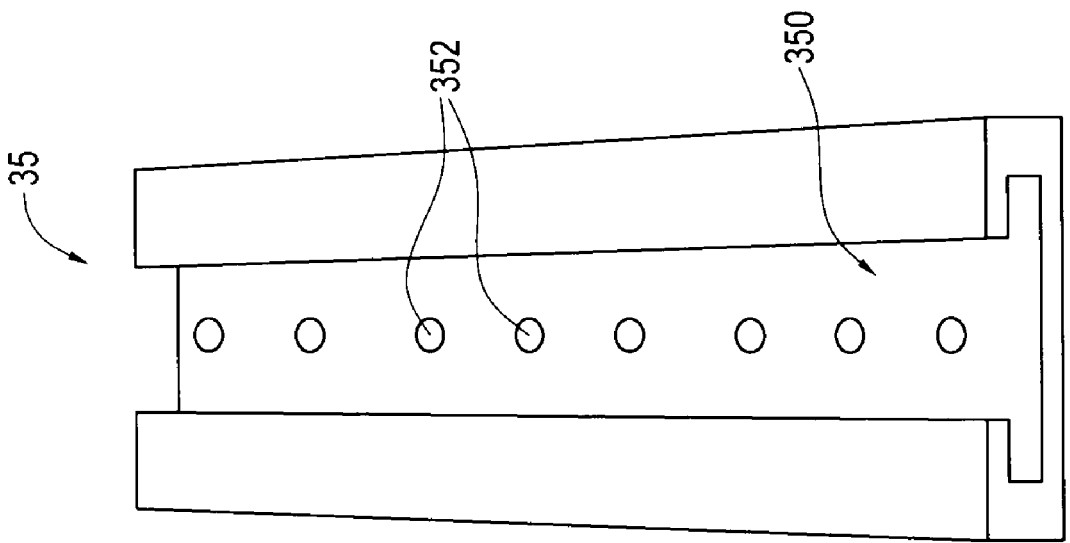
FIG. 8B shows a rail according to one embodiment of the invention.
Figure 8A:
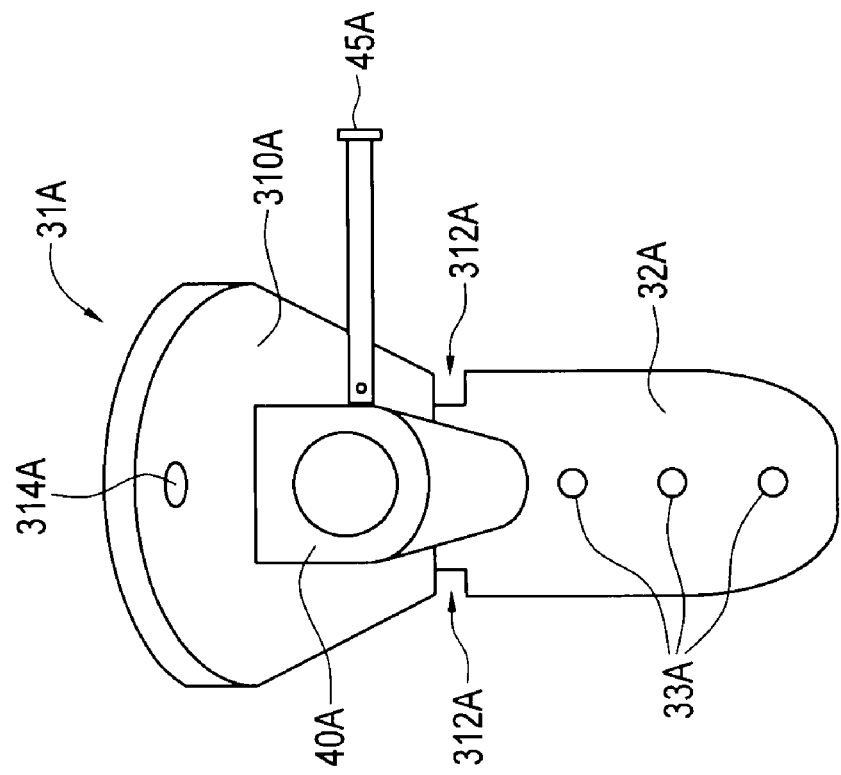
FIG. 8A shows a mounting member according to one embodiment of the invention.

FIG. 8B shows rail 35 in isolation according to an example embodiment. Rail 35 defines a groove 350 which may have a T-shaped cross-section. A plurality of apertures 352 may be defined in rail 35 for facilitating attachment of rail 35 to cycle 10. Referring to FIGS. 6B and 8A, each mounting member 31A, 31B may comprise a base 310A, 310B, and notches 312A, 312B may be defined in flanges 32A, 32B to allow base 310A, 310B to be slidably received in groove 350 of rail 35. An aperture 314A, 314B may be defined in each base 310A, 310B for receiving a set screw 320 or the like, which is also received in one of apertures 352 to hold mounting members 31A, 31B at desired locations along rail 35.

Figure 7:
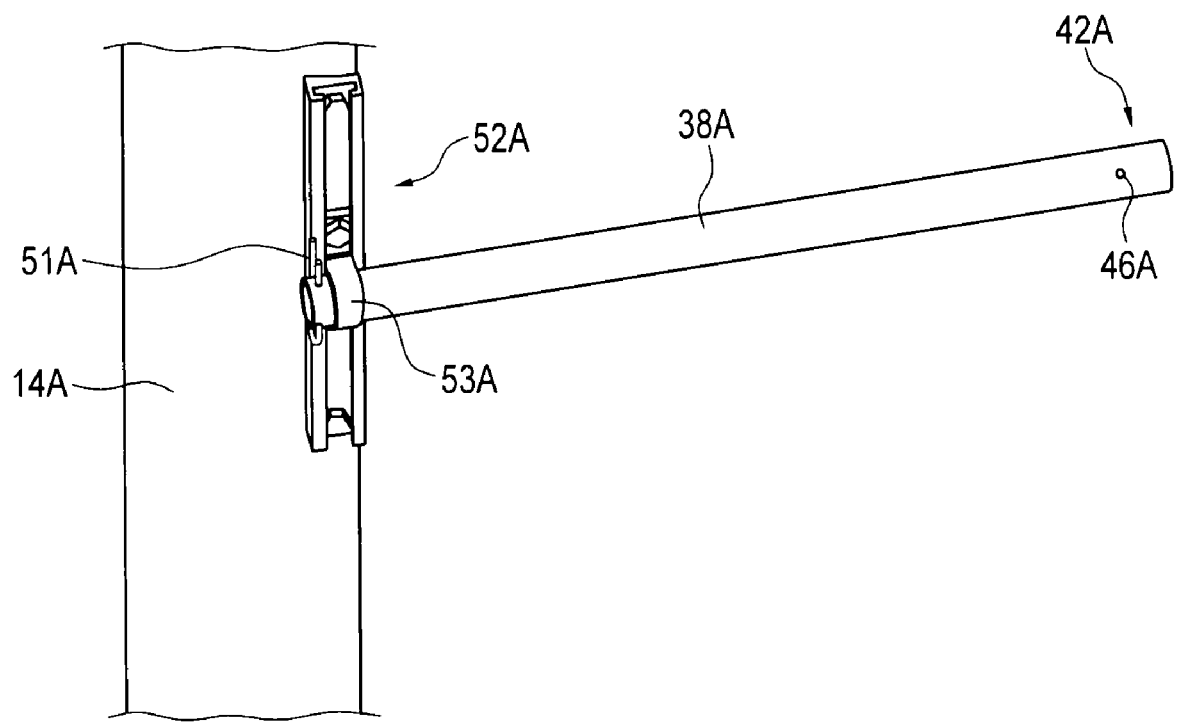
FIG. 7 is a magnified view of an upper support member releasably coupled to an object carrier according to one embodiment of the invention.

Carrying apparatus 12 comprises a plurality of elongated upper support members 38A, 38B. FIG. 7 shows a magnified view of the left side upper support member 38A coupled to object carrier 14A. When carrying apparatus 12 is mounted to cycle 10, upper support members 38A, 38B extend in generally transverse directions to respectively couple object carriers 14A, 14B to upper mounting assembly 30. In this manner, each of support members 38A, 38B acts to support an upper portion of a corresponding one of object carriers 14A, 14B. In the illustrated embodiments, upper mounting assembly 30 comprises a pair of female members 40A, 40B on mounting members 31A, 31B which receive the transversely inward ends 42A, 42B of support members 38A, 38B to facilitate coupling of transversely inward ends 42A, 42B of support members 38A, 38B to upper mounting assembly 30.

Referring to FIGS. 6B, 7 and 8A, carrying apparatus 12 may comprise locking mechanisms 48A, 48B for respectively locking the coupling between transversely inward ends 42A, 42B (of upper support members 38A, 38B) and female members 40A, 40B (of mounting members 31A, 31B). In the illustrated embodiment, locking mechanisms 48A, 48B comprise pins 45A, 45B (or the like), which project through corresponding apertures 44A, 44B provided on female members 40A, 40B and corresponding apertures 46A, 46B provided on inward ends 42A, 42B (FIG. 5A). Pins 45A, 45B of locking mechanisms 48A, 48B may be retained in place by cotter pins (not shown) or some other suitable retaining mechanism such as circlips, hair pins, key rings, or small locks.

In other embodiments, transversely inward ends 42A, 42B of upper support members 38A, 38B are coupled to upper mounting assembly 30 using other coupling mechanisms and/or other suitable locking mechanisms 48A, 48B. For example, upper mounting assembly 30 and transversely inward ends 42A, 42B of upper support members 38A, 38B may be coupled to one another using deformable snap-together fastener components, threadable fastener components or straps secured by hook and loop fasteners, deformable snap-together fastener components, buckles or the like.

Transversely outward ends 50A, 50B of support members 38A, 38B are respectively coupled to object carriers 14A, 14B. In the illustrated embodiment, support members 38A, 38B extend sufficiently far from cycle 10 in the transversely outward direction that cycle 10 can be outfitted with saddlebags 28A, 28B at locations transversely inward of object carriers 14A, 14B. In the illustrated embodiments, support members 38A, 38B have a fixed length which may be selected based upon characteristics of cycle 10 and/or saddlebags 28A, 28B. In other embodiments support members 38A, 38B may comprise telescoping components (not shown) to allow adjustment of the lengths of support members 38A, 38B. In some such embodiments lower support members 64A, 64B may also comprise telescoping components (not shown). In embodiments comprising telescoping upper and/or lower support members 38A, 38B, 64A, 64B, the telescoping components may comprise one or more cam locking devices (not shown), such as, for example, devices used in adjustable bicycle seats or the like.

In the illustrated embodiment, transversely outward ends 50A, 50B of support members 38A, 38B are movably coupled to the bodies 54A, 54B of object carriers 14A, 14B by movable connectors 52A, 52B. Preferably, movable connectors 52A, 52B are located on bodies 54A, 54B of object carriers 14A, 14B, such that when object carriers 14A, 14B are mounted to cycle 10, the portions of bodies 54A, 54B to which movable connectors 52A, 52B are connected are located forwardly and/or upwardly of support members 38A, 38B. Movable connectors 52A, 52B may be mounted on object carriers 14A, 14B using one or more fastener components (not shown). The fastener components may generally comprise any fastener component suitable for connecting moveable connectors 52A, 52B to object carriers 14A, 14B. Non-limiting examples of such fastener components include screws, nuts and bolts, rivets or the like.

In embodiment of FIG. 7, movable connector 52A comprises a slidable eyelet 53A. Eyelet 53A is configured to receive transversely outward end 50A of support member 38A, which may be held in place by a cotter pin 51A or the like. Support member 38A has a round cross-section, such that eyelet 53A may pivot about support member 38A. Pivoting of eyelets 53A, 53B about support members 38A, 38B allows the angles at which object carriers 14A, 14B are inclined with respect to cycle 10 to be adjusted. In some such embodiments, support members 38A, 38B may be detached from object carriers 14A, 14B by removing cotter pins 51A, 51B to facilitate the coupling of object carriers 14A, 14B to one another for use as a single object carrier 16 as explained in more detail below.

In other embodiments, movable connectors 52A, 52B may be respectively pivotable about axes 56A, 56B (FIG. 2), which extend in directions that are generally normal to the surface of bodies 54A, 54B of object carriers 14A, 14B, and about axes 58A, 58B (FIGS. 2 and 3), which extend in the general direction of the longitudinal dimension of object carriers 14A, 14B. This adjustability of movable connectors 52A, 52B facilitates the movement of support members 38A, 38B between: a mounting configuration, wherein support members 38A, 38B extend transversely inwardly from movable connectors 52A, 52B; and a streamlined configuration, wherein support members 38A, 38B extend in the general direction of the longitudinal dimension of object carriers 14A, 14B (as shown in FIGS. 5A and 5B). The streamlined configuration of support members 38A, 38B facilitates the coupling of object carriers 14A, 14B to one another for use as a single object carrier 16 as shown in FIG. 5B and explained in more detail below. This adjustability of movable connectors 52A, 52B also assists with the mounting of carrying apparatus 12 to cycle 10 by adjusting the angles at which upper support members 38A, 38B extend transversely to meet upper mounting assembly 30. In such embodiments, movable connectors 52A, 52B may comprise universal joints which are pivotable about both axes 56A, 56B and axes 58A, 58B. Movable connectors 52A, 52B may alternatively comprise spherical joints (e.g. ball and socket joints) which provide a wide range of mobility. In some embodiments, movable connectors 52A, 52B comprise suitable locking mechanisms (not shown), so that movable connectors 52A, 52B may be locked in one or more configurations to prevent further movement of support members 38A, 38B relative to object carriers 14A, 14B.

Carrying apparatus 12 comprises lower mounting assemblies 60A, 60B, which, when carrying apparatus 12 is mounted to cycle 10, facilitate the coupling of the lower portions of object carriers 14A, 14B to cycle 10. In the illustrated embodiment (as shown best in FIG. 9), lower mounting assemblies 60A, 60B comprise brackets 61A, 61B coupleable to passenger foot peg members 62A, 62B which extend transversely outwardly from cycle 10. Foot peg members 62A, 62B may attach to cycle 10 at their inner ends using standard passenger foot peg attachment hardware such as, for example, bolts 63A, 63B. Brackets 61A, 61B may also be attached to cycle 10 by bolts 63A, 63B. The mechanism for attaching a conventional passenger foot peg to a motorcycle typically comprises a plurality of threaded male fastener components which project through one or more end plate(s) on the foot peg and thread into corresponding female fastener components on the cycle body. The locations and orientations of these fastener components is relatively standard among motorcycles, particularly among motorcycles of the same manufacturer or motorcycles in the same class. Using foot peg members 62A, 62B (rather than the transverse axle members of rear wheel 34 or the rear fender support) to support the lower portions of object carriers 14A, 14B allows the rear fender support to be free to help support saddlebags 28A, 28B and/or luggage carrying apparatus 39, and provides room for saddle bags to extend downwardly on opposing sides 11A, 11B of rear wheel 34.

Foot peg members 62A, 62B are preferably positioned to allow a passenger riding in rearward seat 26 to comfortably rest their feet on foot peg members 62A, 62B. In some embodiments, foot peg members 62A, 62B may comprise conventional passenger foot pegs. Foot peg members 62A, 62B may optionally be provided with rubberized grip members (not specifically enumerated) for receiving the feet of passengers riding in rearward seat 26. Foot peg members 62A, 62B may optionally fold away when they are not in use to support object carriers 14A, 14B or when they are not being used by a passenger in rearward seat 26.

Figure 9:
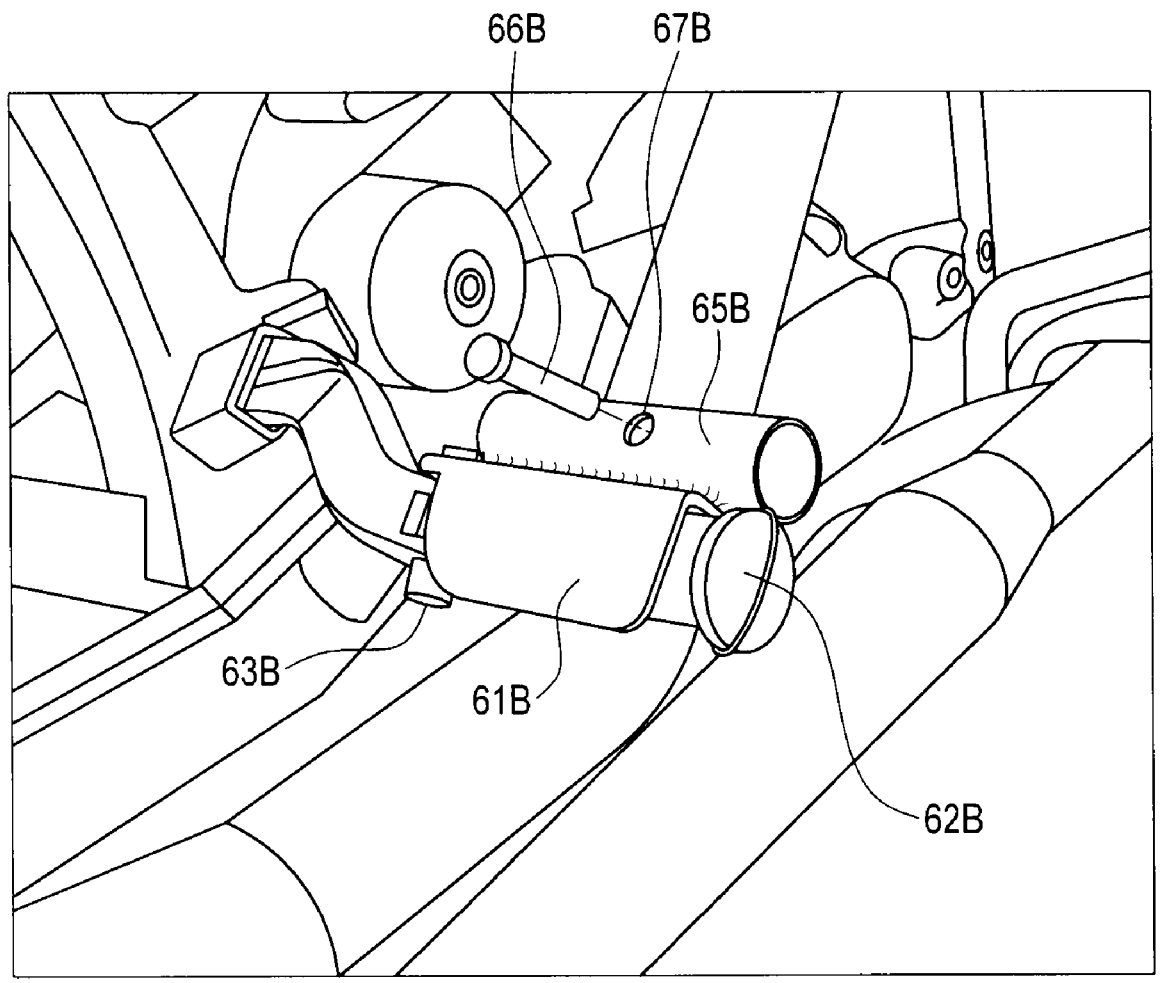
FIG. 9 is a magnified view of a foot peg member and lower mounting assembly according to one embodiment of the invention.
Figure 10:
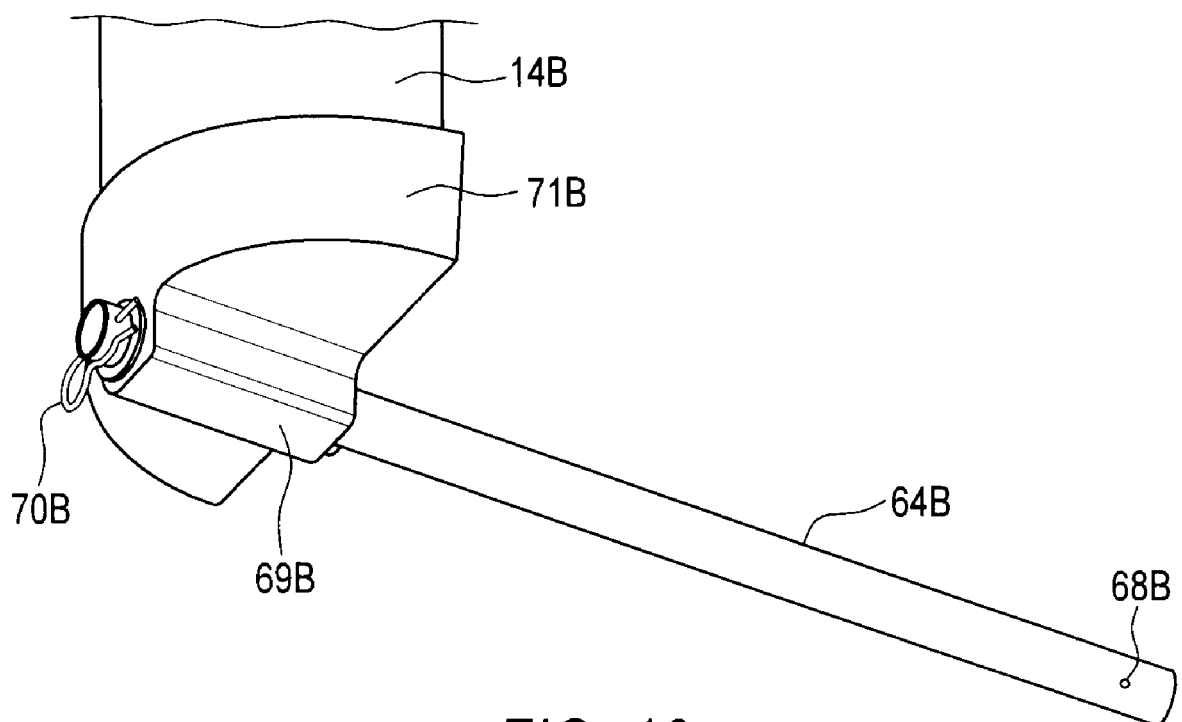
FIG. 10 is a magnified view of a lower support member according to one embodiment of the invention.
Figure 11A:
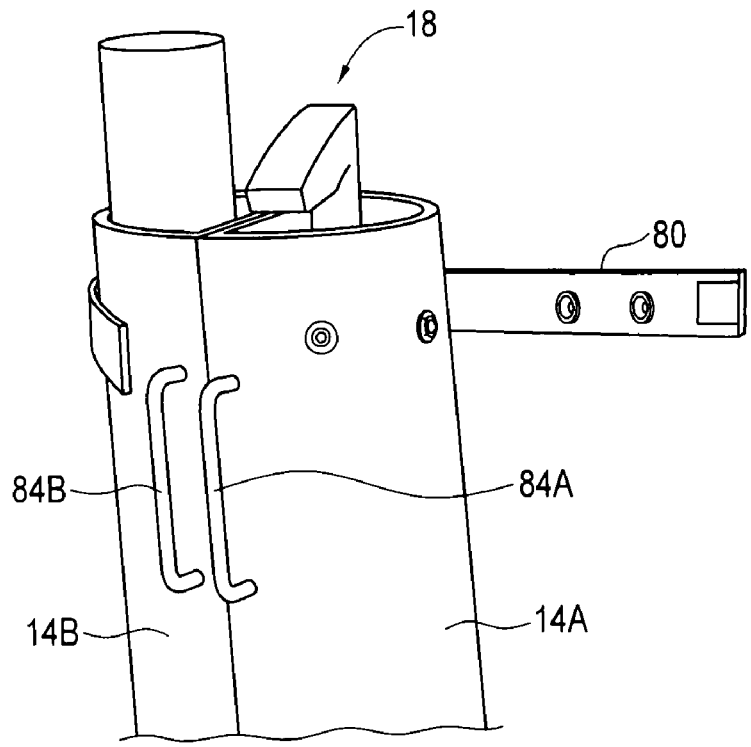
FIG. 11A shows object carriers coupled together by a strap according to one embodiment of the invention.
Figure 11B:
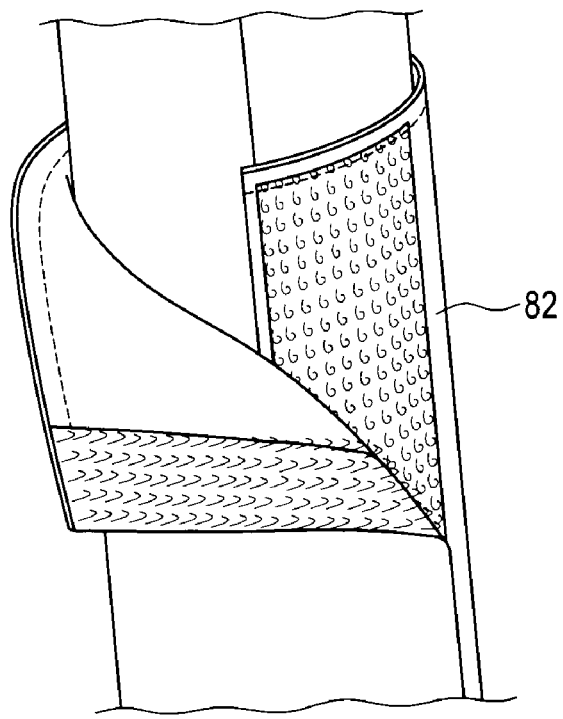
FIG. 11B shows object carriers coupled together by a sleeve according to one embodiment of the invention.

Lower mounting assemblies 60A, 60B may be configured to receive and releasably couple lower support members 64A, 64B which support lower portions of object carriers 14A, 14B. Support members 64A, 64B help provide releasable connections between object carriers 14A, 14B and foot peg members 62A, 62B. Referring to FIGS. 9 and 10, the inward ends of support members 64A, 64B may be received in female members 65A, 65B provided on brackets 61A, 61B. Lower mounting assemblies 60A, 60B may comprise locking mechanisms such as pins 66A, 66B for securing the inward ends of support members 64A, 64B in female members 65A, 65B. In the illustrated embodiment, pins 66A, 66B extend through apertures 67A, 67B in female members 65A, 65B and corresponding apertures 68A, 68B in inward ends of coupling components 64A, 64B. The outward ends of coupling components 64A, 64B may be received in female members 69A, 69B on bottom portions of carriers 14A, 14B and held in place by cotter pins 70A, 70B (FIG. 10). In some embodiments, female members 69A, 69B may be defined in bottom caps 71A, 71B on the bottoms of carriers 14A, 14B.

As shown in FIGS. 5A and 5B, object carriers 14A, 14B may be removed from cycle 10. Preferably, removal of object carriers 14A, 14B is relatively easily accomplished. Object carriers 14A, 14B may be removed from cycle 10 by: (i) unlocking locking mechanisms 48A, 48B between upper support members 38A, 38B and upper mounting assembly 30; (ii) releasing pins 66A, 66B securing lower support members 64A, 64B to brackets 61A, 611B; and (iii) sliding object carriers 14A, 14B transversely outwardly to decouple upper support members 38A, 38B from upper mounting assembly 30 and to decouple lower support members 64A, 64B from lower mounting assemblies 60A, 60B.

As shown in FIGS. 5A and 5B, once object carriers 14A, 14B are removed from cycle 10, moveable connectors 52A, 52B may be adjusted such that upper support members 38A, 38B are in streamlined configurations, where upper support members 38A 38B are generally aligned with the longitudinal dimensions of object carriers 14A, 14B. Object carriers 14A, 14B may comprise suitable retaining mechanisms (not shown) for securing upper support members 38A, 38B in their streamlined configurations. Such retaining mechanisms may comprise, for example, loops of flexible material located on the bodies 54A, 54B of object carriers 14A, 14B, wherein the loops of material may be opened at one end to admit support members 38A, 38B and subsequently closed to secure support members 38A, 38B in their streamlined configurations. Such retaining mechanisms may alternatively comprise J-shaped hooks or locking hooks located on the bodies 54A, 54B of object carriers 14A, 14B, for example, wherein the hooks are suitable for engaging apertures 46A, 46B of support members 38A, 38B, the shafts of support members 38A, 38B or other parts of support members 38A, 38B. Those skilled in the art will appreciate that there are a wide variety of alternative retaining mechanisms which may be used to secure support members 38A, 38B in their streamlined configurations. In some embodiments, movable connectors 52A, 52B may comprise locking mechanisms (not shown) which may be used to lock support members 38A, 38B in their streamlined configurations. In other embodiments, such as shown for example in FIG. 7, support members 38A, 38B may be removed from carriers 14A, 14B entirely.

Once object carriers 14A, 14B are removed from cycle 10, object carriers 14A, 14B may be coupled to one another to form a single object carrier 16 (FIG. 5B). To facilitate this coupling, object carriers 14A, 14B may be shaped to provide substantially planar surfaces 15A, 15B which abut against one another when object carriers 14A, 14B form a single object carrier 16. To form object carrier 16, object carriers 14A, 14B may generally be coupled to one another using any suitable coupling mechanism. As will be apparent to one skilled in the art, such coupling mechanisms may include, for example, a snap-on strap 80 (FIG. 1A), a removable sleeve 82 (FIG. 1B) having hook and loop fastening components or the like, interlocking features (not shown) on object carriers 14A, 14B, or other coupling mechanisms.

In some embodiments, when object carriers 14A, 14B are disconnected from cycle 10, support members 38A, 38B may be coupled to one another to couple the upper portions of object carriers 14A, 14B to one another. The coupling of support members 38A, 38B to one another may secure the upper portions of object carriers 14A, 14B to one another to help form a single object carrier 16. In some embodiments, the bottom portions of object carriers 14A, 14B may be coupled to one another by a coupling member (not shown) received in both female members 69A, 69B on the bottom portions of object carriers 14A, 14B. The coupling member may comprise, for example, one of lower support members 64A, 64B.

In addition to helping to couple the top halves of object carriers 14A, 14B to one another support members 38A, 38B may act as a handle which can be used to lift the resulting single object carrier 16. In other embodiments, handles 84A, 84B (FIGS. 1, 2, 11A, 11B) may be provided on carriers 14A, 14B.

While a number of exemplary aspects and embodiments have been discussed above, those of skill in the art will recognize certain modifications, permutations, additions and sub-combinations thereof. For example:

Locking mechanisms 48A, 48B described above are implemented using pins (or the like) 45A, 45B which project through corresponding apertures 44A, 44B (on upper mounting assembly 30) and 46A, 46B (on support members 38A, 38B). Those skilled in the art will appreciate that other forms of locking mechanisms 48A, 48B may be used. By way of non-limiting example, locking mechanisms, 48B may comprise circlip-based locking mechanisms, pawl-based locking mechanisms, threaded fastener locking mechanisms or the like.

In some embodiments described above, movable connectors 52A, 52B are movable about axes 56A, 56B and about axes 58A, 58B. This is not necessary. In some embodiments, movable connectors 52A, 52B are movable only about axes 56A, 56B or only about axes 58A, 58B. In such embodiments, movable connectors 52A, 52B may comprise suitably configured pivot joints. In still other embodiments, connectors 52A, 52B are not movable (except possibly by deformation).

While the embodiments described above show object carriers 14A, 14B mounted to both sides 11A, 11B of cycle 10, it will be appreciated that a single object carrier could be mounted to one side 11A or 11B of cycle 10.

Accordingly, the scope of the invention should be construed in accordance with the substance defined by the following claims.

The invention claimed is:

1. A carrying apparatus for a cycle-type vehicle comprising:
    a pair of object carriers releasably mountable on corresponding transverse sides of the cycle;
    a pair of upper support members which extend transversely between the cycle and the object carriers to support upper portions of the object carriers, the upper support members releasably coupleable to an upper mounting assembly mounted on the cycle at a location above the rear wheel of the cycle; and
    a pair of lower support members which extend transversely between the cycle and the object carriers to support lower portions of the object carriers;
    wherein the upper mounting assembly comprises a pair of mounting members having female members thereon for releasably coupling inward ends of the upper support members; and
    wherein the mounting members are mounted to a backrest of a rearward seat of the cycle.

2. A carrying apparatus according to claim 1 wherein the lower support members and the upper support members extend sufficiently far in the transversely outward direction to accommodate legs of a passenger seated on a rearward seat of the cycle.

3. A carrying apparatus according to claim 1 wherein the lower support members and the upper support members extend sufficiently far in the transversely outward direction to accommodate conventionally mounted saddlebags.

4. A carrying apparatus according to claim 1 wherein the lower support members are only connected to the upper support members through the object carriers.

5. A carrying apparatus according to claim 1 wherein the upper mounting assembly comprises locking mechanisms for preventing uncoupling of the upper support members when the locking mechanisms are engaged.

6. A carrying apparatus according to claim 5 wherein the locking mechanisms comprise pins insertable through apertures defined in the upper mounting assembly and the upper support members.

7. A carrying apparatus according to claim 1 comprising movable connectors for coupling outward ends of the upper support members to the object carriers.

8. A carrying apparatus according to claim 7 wherein the movable connectors comprise slidable eyelets for receiving the outward ends of the upper support members.

9. A carrying apparatus according to claim 1 comprising female members on bottom portions of the object carriers for coupling outward ends of the lower support members to the object carriers.

10. A carrying apparatus according to claim 9 wherein the female members are defined in bottom caps on the bottom portions of the object carriers.

11. A carrying apparatus according to claim 1 wherein the lower support members are releasably coupleable to foot peg members which extend transversely outwardly from the cycle.

12. A carrying apparatus according to claim 11 wherein the lower support members are releasably coupleable to the foot peg members by brackets mounted on the foot peg members, the brackets having female members thereon for releasably coupling inward ends of the lower support members.

13. A carrying apparatus according to claim 12 wherein the lower mounting assembly comprises locking mechanisms for securing the inward ends of the lower support members within the female members of the brackets.

14. A carrying apparatus according to claim 13 wherein the locking mechanisms comprise pins insertable through apertures defined in the female members and the lower support members.

15. A carrying apparatus for a cycle-type vehicle comprising:
a pair of object carriers releasably mountable on corresponding transverse sides of the cycle;
a pair of upper support members which extend transversely between the cycle and the object carriers to support upper portions of the object carriers, the upper support members releasably coupleable to an upper mounting assembly mounted on the cycle at a location above the rear wheel of the cycle; and
a pair of lower support members which extend transversely between the cycle and the object carriers to support lower portions of the object carriers;
wherein the upper mounting assembly comprises a pair of mounting members having female members thereon for releasably coupling inward ends of the upper support members; and
wherein the upper mounting assembly comprises a rail mounted on the cycle behind a rearward seat, the rail defining a groove therein, and wherein the mounting members are slidably receiveable in the groove of the rail.

16. A carrying apparatus according to claim 15 wherein the lower support members are releasably coupleable to foot peg members which extend transversely outwardly from the cycle.

17. A carrying apparatus according to claim 15 wherein the lower support members and the upper support members extend sufficiently far in the transversely outward direction to accommodate legs of a passenger seated on a rearward seat of the cycle.

18. A carrying apparatus according to claim 15 wherein the lower support members and the upper support members extend sufficiently far in the transversely outward direction to accommodate conventionally mounted saddlebags.

19. A carrying apparatus according to claim 15 wherein the lower support members are only connected to the upper support members through the object carriers.

20. A carrying apparatus according to claim 15 wherein the upper mounting assembly comprises locking mechanisms for preventing uncoupling of the upper support members when the locking mechanisms are engaged.

21. A carrying apparatus according to claim 15 comprising movable connectors for coupling outward ends of the upper support members to the object carriers.

* * * * *